United States Patent
Imai

(10) Patent No.: US 7,560,700 B2
(45) Date of Patent: Jul. 14, 2009

(54) RADIATION IMAGE DETECTOR

(75) Inventor: Shinji Imai, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/016,775

(22) Filed: Jan. 18, 2008

(65) Prior Publication Data
US 2008/0203310 A1 Aug. 28, 2008

(30) Foreign Application Priority Data
Jan. 19, 2007 (JP) .............................. 2007-009872

(51) Int. Cl.
*G01T 1/24* (2006.01)

(52) U.S. Cl. .............................. 250/370.08; 250/370.09; 250/370.11; 250/371; 250/580; 250/591

(58) Field of Classification Search ............ 250/370.08, 250/370.09, 370.11, 371, 580, 591
See application file for complete search history.

(56) References Cited

U.S. PATENT DOCUMENTS

| | | | |
|---|---|---|---|
| 4,599,118 A * | 7/1986 | Han et al. | ................... 438/291 |
| 6,268,614 B1 | 7/2001 | Imai | |
| 6,539,076 B1 * | 3/2003 | Shoji | .......................... 378/98.8 |
| 6,770,901 B1 * | 8/2004 | Ogawa et al. | ............... 250/591 |
| 6,984,551 B2 * | 1/2006 | Yamazaki et al. | ........... 438/164 |
| 6,995,375 B2 | 2/2006 | Sato et al. | |
| 7,034,312 B2 | 4/2006 | Sato et al. | |
| 7,257,500 B2 * | 8/2007 | Yamaguchi | ................... 702/69 |
| 7,297,974 B2 * | 11/2007 | Imai | .......................... 250/591 |
| 2006/0128081 A1 * | 6/2006 | Yamazaki et al. | ........... 438/164 |

* cited by examiner

*Primary Examiner*—David P Porta
*Assistant Examiner*—Djura Malevic
(74) *Attorney, Agent, or Firm*—Sughrue Mion, PLLC

(57) ABSTRACT

Generation of residual images due to charge leakage is suppressed. A radiation image detector is constituted by: an upper planar electrode that transmits electromagnetic waves bearing radiation image information; a charge generating layer that generates electric charges when irradiated by the electromagnetic waves which are transmitted through the upper planar electrode; and a plurality of divided electrodes for collecting the electric charges generated by the charge generating layer. The divided electrodes have inclined electrode surfaces, which are inclined with respect to the upper planar electrode.

9 Claims, 7 Drawing Sheets

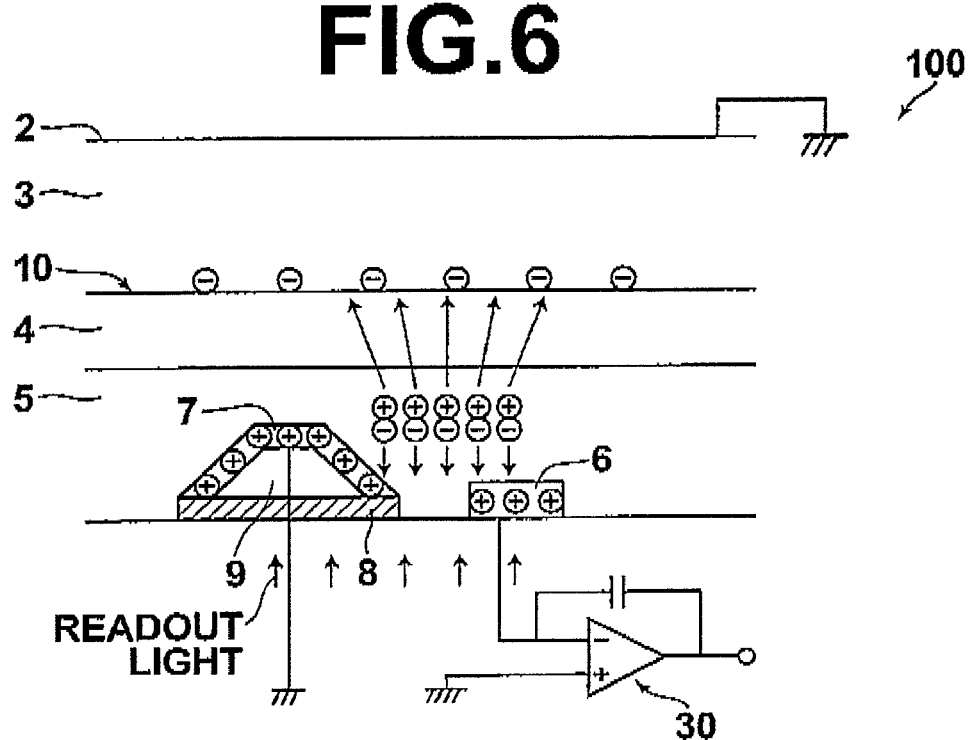
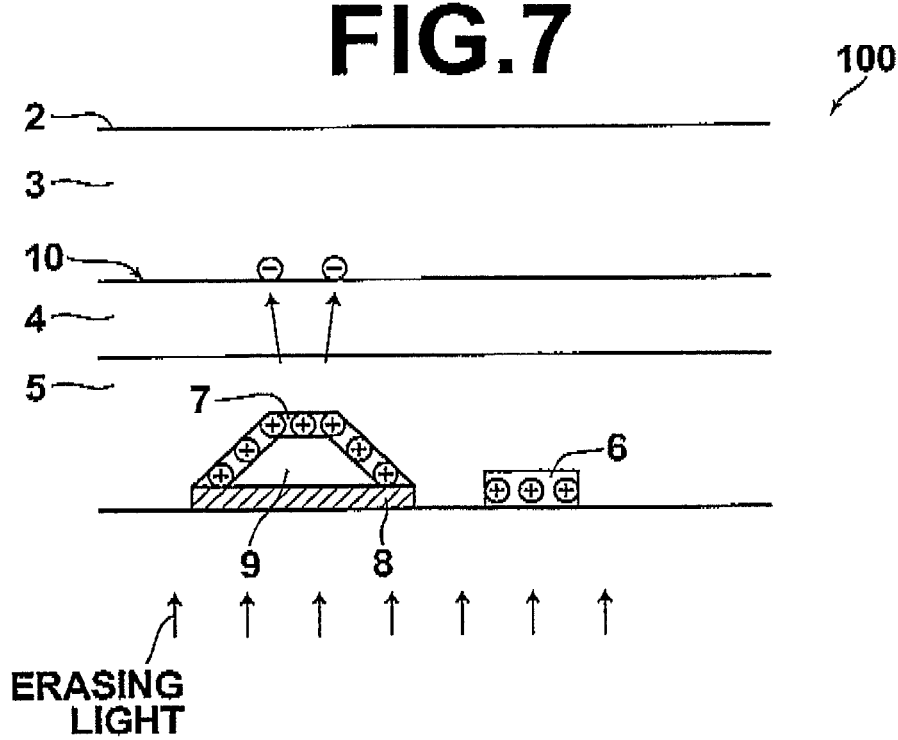

RADIATION IMAGE DETECTOR

BACKGROUND OF THE INVENTION

1. Field of the Invention

The present invention relates to a radiation image detector that records a radiation image by being irradiated by radiation bearing a radiation image, from which signals corresponding to the radiation image are read out by being scanned with readout light, and from which residual charges are erased by being irradiated with erasing light.

2. Description of the Related Art

Various types of radiation image detectors that generate charges by being irradiated with radiation which has passed through subjects and record radiation images of the subjects by accumulating the charges have been proposed and are in actual use in the field of medicine and the like.

For example, U.S. Pat. Nos. 6,995,375 and 7,034,312 discloses a radiation image detector constituted by: an upper planar electrode, which is formed on one side of a radiation sensitive semiconductor material; and a plurality of divided electrodes, which are formed on the other side of the semiconductor material. In this radiation image detector, radiation is irradiated onto the semiconductor material in a state in which a biasing voltage is being applied between the upper planar electrode and the divided electrodes. The irradiation of the radiation causes electric charges to be generated within the semiconductor material, and the generated charges are read out as electrical signals by each of the divided electrodes. Thereby, the spatial distribution of the irradiated radiation can be detected.

U.S. Pat. No. 6,268,614 discloses another radiation image detector. This radiation image detector is constituted by: a first electrode layer (upper planar electrode) that transmits radiation; a recording photoconductive layer that generates electric charges when irradiated by radiation; a charge transport layer that functions as an insulator with respect to latent image charges and functions as a conductor with respect to charges having a polarity opposite that of the latent image charges; a readout photoconductive layer that generates electric charges when irradiated by readout light; and a second electrode layer (divided electrodes), in which linear electrodes that transmit the readout light are provided, stacked in this order. When recording a radiation image using this radiation image detector, first, radiation which has passed through a subject is irradiated onto the radiation image detector while applying a high negative voltage to the first electrode layer and a high positive voltage to the second electrode layer. The radiation is irradiated onto the recording photoconductive layer, and charge pairs are generated at the portions of the recording photoconductive layer onto which the radiation is irradiated. Positive electric charges among the charge pairs move toward the charged first electrode layer, combine with the negative charges at the first electrode layer, and disappear. Negative electric charges among the charge pairs move toward the charged second electrode layer. However, the charge transport layer functions as an insulator with respect to negative electric charges, as described above. For this reason, the negative electric charges are accumulated at a charge accumulating section at the interface between the recording photoconductive layer and the charge transport layer. The radiation image is recorded by the accumulation of the negative electric charges at the charge accumulating section.

When the recorded radiation image is to be read out from the radiation image detector, readout light is emitted thereon from the side of the second electrode layer. The irradiated readout light enters the readout photoconductive layer, and charge pairs are generated therein. Positive electric charges from among the charge pairs combine with the negative electric charges, which are accumulated at the charge accumulating section. At the same time, negative electric charges from among the charge pairs combine with the positive charges of the charged transparent linear electrodes. The combinations of charges cause current to be detected by current detecting amplifiers connected to the transparent linear electrodes. The current is combined into voltages, which are output as image signals. Residual charges remaining at the charge accumulating section are erased by irradiation of erasing light.

In the radiation image detector disclosed in U.S. Pat. Nos. 6,995,375 and 7,034,312, there are cases in which a portion of signal charges generated due to X ray irradiation is not collected by the divided electrodes, and are accumulated between the divided electrodes. In these cases, problems, such as the occurrence of sensitivity variations and residual images, arise.

Similarly, in the radiation image detector disclosed in U.S. Pat. No. 6,268,614, there are cases in which a portion of signal charges generated due to X ray irradiation is not accumulated in the charge accumulating section, and charge leakage occurs through the charge accumulating section. Charge leakage is likely to occur particularly when high dosage X ray irradiation is performed. The charges that leak through the charge accumulating section within regions above the linear electrodes are discharged by the linear electrodes. On the other hand, the charges that leak through the charge accumulating section within regions above the spaces between the linear electrode are not discharged, and are charged in the spaces between the linear electrodes. This causes a problem that residual images occur.

The problems caused by the charge leakage can be lessened by causing the spaces among adjacent divided electrodes (including transparent linear electrodes) to be narrower. However, there is a possibility that electrical shorts will occur among adjacent divided electrodes if the spaces therebetween are narrowed. Additionally, there is a limit to how narrow the spaces between divided electrodes can be, due to readout noise being increased along with the capacities of the electrodes becoming greater. Accordingly, there is a problem that leaked charges being charged among adjacent divided electrodes cannot be reduced.

SUMMARY OF THE INVENTION

The present invention has been developed in view of the foregoing circumstances. It is an object of the present invention to provide a radiation image detector that can suppress the occurrence of residual images and sensitivity variations caused by leaked charges being charged among adjacent divided electrodes.

A radiation image detector of the present invention comprises:

an upper planar electrode that transmits electromagnetic waves bearing radiation image information;

a charge generating layer that generates electric charges when irradiated by the electromagnetic waves which are transmitted through the upper planar electrode; and a plurality of divided electrodes for collecting the electric charges generated by the charge generating layer; wherein:

the divided electrodes have inclined electrode surfaces, which are inclined with respect to the upper planar electrode.

Here, the "electromagnetic wave bearing radiation image information" may be radiation or recording light.

Note that the widths of the inclined electrode surfaces is not limited, but it is desirable for the widths of the inclined electrode surfaces to be 1/10 the intervals between the divided electrodes or greater.

The shapes of the divided electrodes are not limited, as long as they have the inclined electrode surfaces. For example, the inclined electrode surfaces may be provided at the outer peripheral portions of the divided electrodes; and flat electrode surfaces, which are substantially parallel to the upper planar electrodes, may be provided on the divided electrodes between the inclined electrode surfaces.

Note that the shapes of the inclined electrode surfaces are not limited as long as they are inclined with respect to the upper planar electrode. For example, the inclined electrode surfaces may be formed as planar surfaces, or as curved surfaces.

Further, the plurality of divided electrodes may be of any construction. For example, the divided electrodes may be of a structure in which rectangular electrodes are arranged in a matrix, to read out radiation images by the so called TFT method.

Alternatively, the plurality of divided electrodes may be of a structure in which a plurality of linear electrodes are arranged as stripes. In this case, the charges which are generated in the charge generating layer are read out while scanning readout light along the longitudinal direction of the linear electrodes, and the inclined electrode surfaces are formed at the ends of the linear electrodes in the direction perpendicular to the longitudinal direction thereof.

The radiation image detector of the present invention comprises: the upper planar electrode that transmits electromagnetic waves bearing radiation image information; the charge generating layer that generates electric charges when irradiated by the electromagnetic waves which are transmitted through the upper planar electrode; and plurality of divided electrodes for collecting the electric charges generated by the charge generating layer. The divided electrodes have the inclined electrode surfaces, which are inclined with respect to the upper planar electrode. The electrical fields generated by the inclined electrode surfaces when the inclined electrode surfaces are charged operate within the spaces among the divided electrodes. Thereby, it becomes easier for charges which have leaked through regions above the spaces among the divided electrodes to be drawn into the inclined electrode surfaces, and the occurrence of residual images caused by charge leakage can be reduced. Even when high dosage radiation is irradiated onto the radiation image detector, the occurrence of residual images and sensitivity variations due to charge leakage can be reduced.

Note that the widths of the inclined electrode surfaces may be 1/10 the intervals between the divided electrodes or greater. In this case, drawing of the leaked charges into the inclined electrode surfaces is facilitated further. Accordingly, the occurrence of residual images caused by residual electric charges can be more effectively reduced.

The inclined electrode surfaces may be provided at the outer peripheral portions of the divided electrodes; and flat electrode surfaces, which are substantially parallel to the upper planar electrodes, may be provided on the divided electrodes between the inclined electrode surfaces. In this case, the flat electrode surfaces can positively read out signal charges and discharge residual charges, while the inclined electrode surfaces can remove leaked charges.

BRIEF DESCRIPTION OF THE DRAWINGS

FIG. 6 is a diagram that illustrates how a radiation image is read out from the radiation image detector of FIG. 3.

FIG. 7 is a diagram that illustrates how residual electric charges are erased from the radiation image detector of FIG. 3.

BEST MODE FOR CARRYING OUT THE INVENTION

Figure 1:
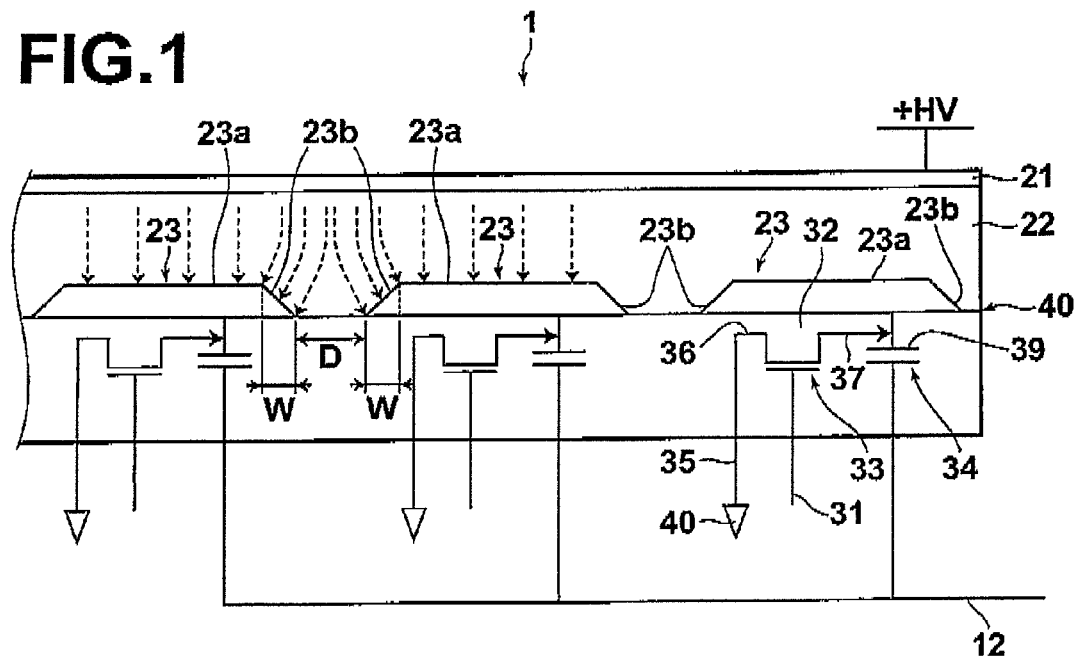
FIG. 1 is a sectional view of a radiation image detector according to a first embodiment of the present invention.
Figure 2:
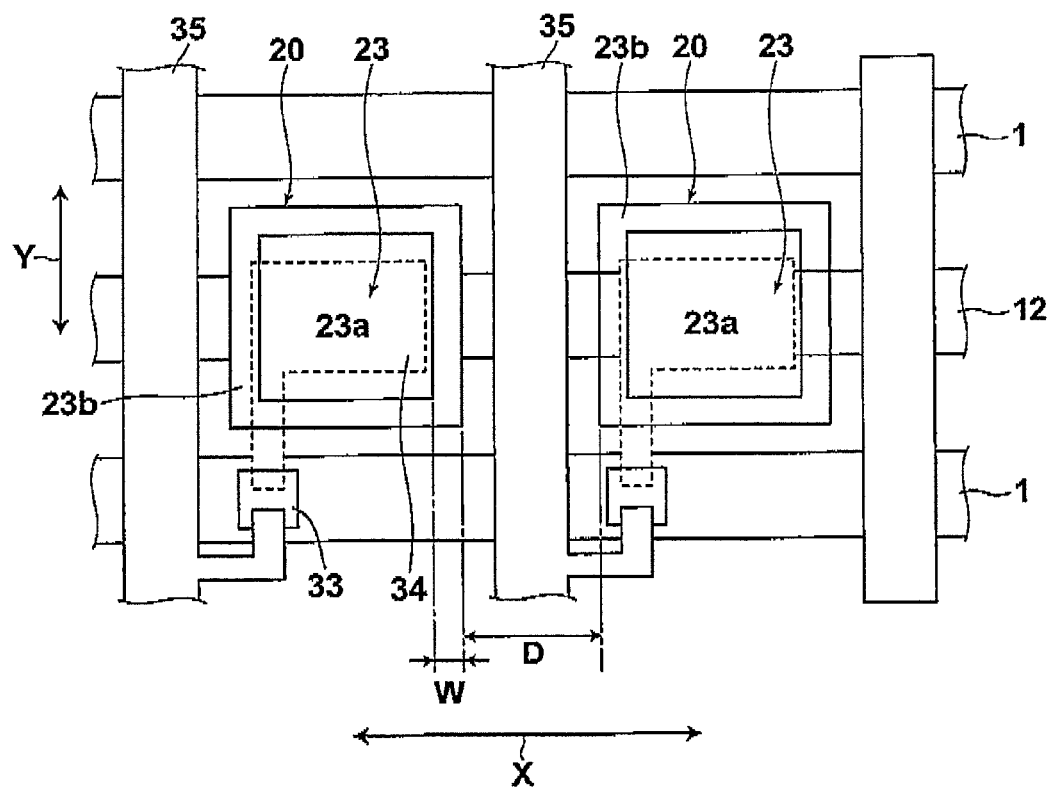
FIG. 2 is a plan view of the radiation image detector of FIG. 1.

Hereinafter, embodiments of the radiation image detector of the present invention will be described with reference to the attached drawings. FIG. 1 is a sectional view of a radiation image detector 1 according to a first embodiment of the present invention. FIG. 2 is a plan view of the radiation image detector 1 of FIG. 1. The radiation image detector 1 is that which employs the TFT method, and is equipped with an upper planar electrode 21, a charge generating layer 22, and divided electrodes 23.

The upper planar electrode 21 is formed by a low resistance conductive material that transmits radiation, such as Au. The upper planar electrode 21 is formed substantially as a plate on the charge generating layer 22. A high voltage source HV, for applying biasing voltage, is connected to the upper planar electrode 21. The high voltage source HV applies high voltage to the upper planar electrode when recording radiation image data.

The charge generating layer 22 generates electric charges according to amounts of radiation when radiation is irradiated thereon. The charge generating layer 22 is constituted by a 100 μm to 1000 μm thick non crystalline a-Se film having selenium as its main component.

The divided electrodes 23 (pixel electrodes) are 0.05 μm to 1 μm thick films made of Al, Au, Cr, ITO (Indium Tin Oxide), IZO (Indium Zinc Oxide) or the like. The charge generating layer 22 is stacked on the divided electrodes 23. Accordingly, the divided electrodes 23 are of a structure in which they are electrically connected to the charge generating layer 22 in series, and are capable of collecting electric charges generated in the charge generating layer 22. Note that an electron stopping layer formed by a thin insulating layer may be provided between the charge generating layer 22 and the divided electrodes 23. As illustrated in FIG. 2, the divided electrodes 23 are rectangular in shape, and are arranged in both the horizontal direction (the direction indicated by arrow X) and the vertical direction (the direction indicated by arrow Y) in the form of a matrix. The electric charges generated within the charge generating layer 22 are collected by the divided electrodes 23. The electric charges collected by each of the divided electrodes become pixel data of a radiation image.

Each divided electrode 23 is equipped with a flat electrode surface 23$a$, which is substantially parallel to the upper planar electrode 21, and inclined electrode surfaces 23$b$, which are inclined with respect to the upper planar electrode 21. The inclined electrode surfaces 23$b$ are provided at the outer peripheral portions of the flat electrode surface 23$a$, and are formed such that the angles of inclination a thereof with respect to the upper planar electrode 21 (and the flat electrode surface 23$a$) is 45°, for example. Further, the widths W of the inclined electrode surfaces 23$b$ are formed to be $\frac{1}{10}$ the length of the space D between adjacent divided electrodes 23 or greater (W≧D/10).

Note that the electric charges collected by each divided electrode 23 are accumulated in a charge accumulating section 34 corresponding thereto. The electric charges which are accumulated by the charge accumulating sections 34 are read out via a plurality of switching elements 33. Specifically, each of the switching elements 33 is constituted by a thin film transistor (TFT), and a scanning line 31 for turning the switching element 33ON and OFF is connected to a gate electrode 32 thereof. Each of the charge accumulating sections 34 is connected to a drain electrode 37 of the switching element 33, and an amplifier 40 is connected to a source electrode 36 of the switching element 33 via a data line 35. When a signal to turn the switching element 33ON is input from the scanning line 31, the signal charges accumulated in the charge accumulating section 34 are input to the amplifier 40 from the drain electrode 37 via the source electrode 36 and the data line 35.

Next, the operation of the radiation image detector 1 will be described with reference to FIG. 1 and FIG. 2. Recording radiation, such as X rays, bearing a radiation image is irradiated from the upper direction of FIG. 1 while the high voltage source HV is applying high voltage between the upper planar electrode 21 and each of the divided electrodes 23. The radiation passes through the upper planar electrode 21 and is irradiated onto the charge generating layer 22. Electric charges corresponding to the amount of radiation are generated in the charge generating layer 22. Among the generated electric charges, electrons move toward the upper planar electrode 21 (+electrode), and positive holes move toward the divided electrodes 23 (−electrodes). Thereby, electric charges are accumulated in the charge accumulating sections 34.

Thereafter, signals for turning the switching elements 33ON are input via the scanning lines 31, and the electric charges accumulated in the charge accumulating sections 34 are taken out via the data lines 35. The amplifiers 40 detect the amount of electrical charges for each pixel, to read out image data. Two dimensional X ray image data can be obtained, by the switching operation described above being sequentially performed on the switching elements 33, which are connected to the divided electrodes arranged in a matrix in the X and Y directions.

Here, the inclined electrode surfaces 23$b$ are provided at the outer peripheral portions of the divided electrodes 23. Therefore, charging of leaked charges in the spaces between adjacent divided electrodes 23 is reduced, and the occurrence of residual images due to residual electric charges can be prevented. That is, leaked charges, which are generated in the charge generating layer 22 above the divided electrodes 23, are discharged by the divided electrodes 23. On the other hand, there are cases in which leaked charges, which pass through the spaces D between adjacent divided electrodes 23, are not discharged by the divided electrodes, and remain in the charge generating layer 22. The residual electric charges remain in the charge generating layer 22 particularly in cases that X rays are irradiated at high dosages.

However, the inclined electrode surfaces 23$b$ are formed at the outer peripheries of the divided electrodes. The inclined electrode surfaces 23$b$ form electrical fields in directions different from the electrical fields of the flat electrode surfaces 23$a$. Accordingly, leaked electric charges that pass through the regions above the spaces between adjacent divided electrodes 23 can be drawn toward the inclined electrode surfaces 23$b$ and discharged. Thereby, the amount of leaked electric charges which are charged in the spaces D among the divided electrodes 23 during readout of signal charges can be reduced, and the occurrence of residual images due to leaked electric charges can be suppressed.

It was found that electric fields sufficiently large to draw the leaked charges into the inclined electrode surfaces 23$b$ are capable of being formed, in the case that the widths W of the inclined electrode surfaces 23$b$ are formed to be $\frac{1}{10}$ the length of the space D between adjacent divided electrodes 23 or greater. Accordingly, the residual electric charges could be positively removed.

Figure 3:
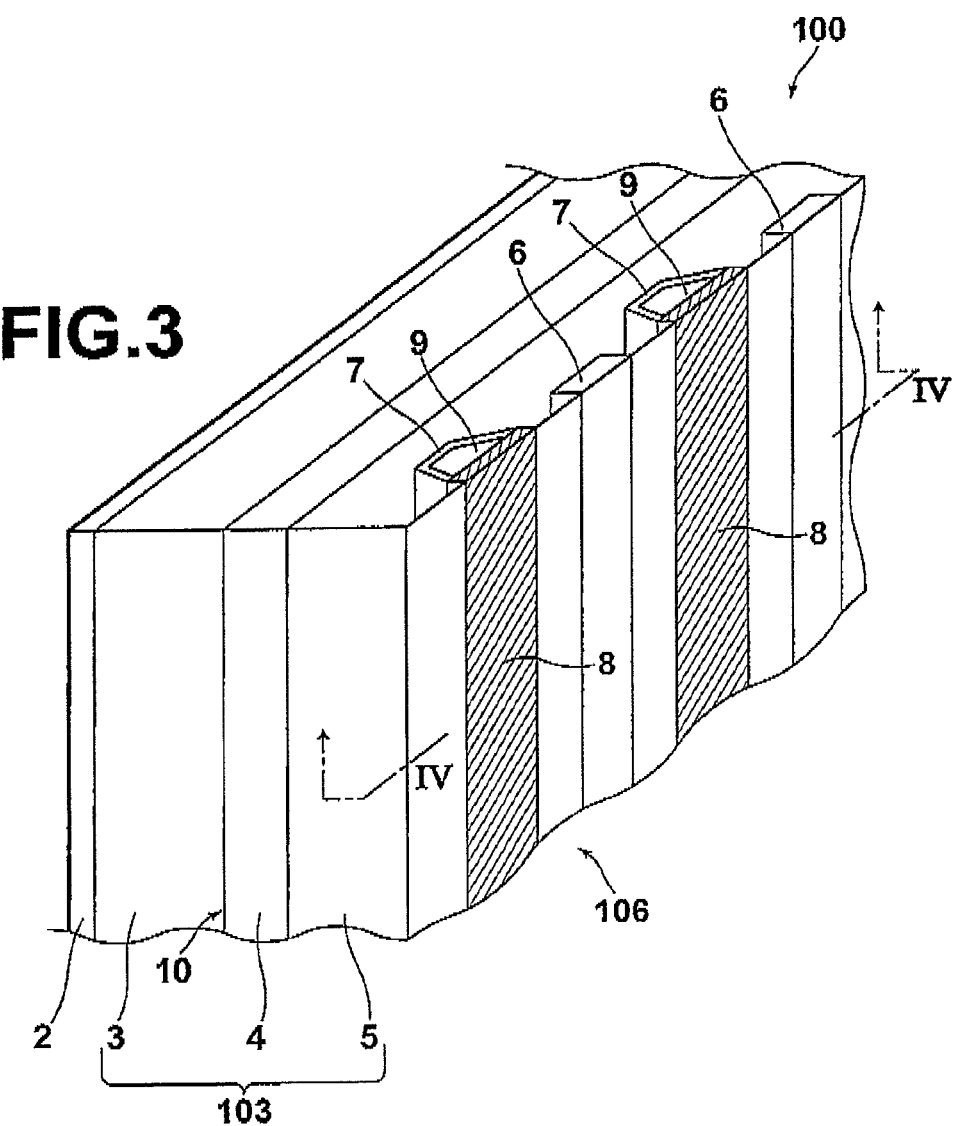
FIG. 3 is a diagram that schematically illustrates a radiation image detector according to a second embodiment of the present invention.
Figure 4:
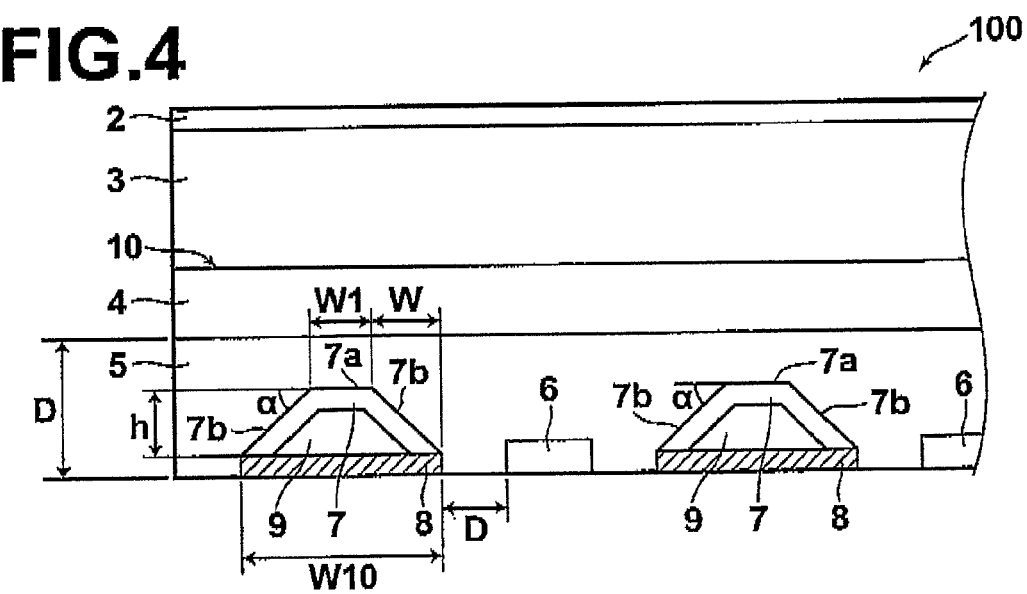
FIG. 4 is a sectional view of the radiation image detector according to the second embodiment, taken along line IV-IV of FIG. 3.

FIG. 3 and FIG. 4 are diagrams that schematically illustrate a radiation image detector 100 according to a second embodiment of the present invention. Note that elements of the radiation image detector 100 which are the same as those of the radiation image detector 1 will be denoted with the same reference numerals, and detailed descriptions thereof will be omitted. The radiation image detector 100 of FIG. 3 differs from the radiation image detector 1 of FIG. 1 in the construction of the divided electrodes. While the radiation detector 1 employs a readout method called the TFT method, the radiation detector 100 is a solid state detector that employs an optical readout method, in which radiation images are read out by readout light being irradiated thereon.

The radiation image detector 100 is equipped with: an upper planar electrode 2; a charge generating layer 103; divided electrodes 106; readout light shielding films 8; a backing layer 9; and the like. Note that the radiation image detector 100 is formed on a light transmissive substrate (a glass substrate, for example), which is not shown in FIG. 3 and FIG. 4.

The upper planar electrode 2 is to be charged with negative electric charges during recording of radiation image data, and is formed as a flat plate. The upper planar electrode 2 is formed by a material that transmits radiation. The upper planar electrode 2 may be formed by NESA ($SnO_2$), ITO (Indium Tin Oxide), IDIXO (Idemitsu Indium X-metal Oxide by Idemitsu), which is an amorphous light transmissive oxide film, or the like, formed to a thickness of 50 nm to 200 nm. Alternatively, the upper planar electrode 2 may be formed by Al or Au films or the like having a thickness of 100 nm.

The charge generating layer 103 is equipped with a recording photoconductive layer 3, a charge transport layer 4, and a readout photoconductive layer 5. The recording photoconductive layer 3 generates charge pairs when irradiated with radiation. The recording photoconductive layer 3 is formed by a film having a-se as its main component and a thickness of approximately 500 μm. The film having a-se as its main component is selected because a-se is superior in that it has high quantum efficiency with respect to radiation, and high dark resistance.

The charge transport layer 4 functions as an insulator with respect to electric charges of one of the polarities from between the charge pairs generated within the recording photoconductive layer 3, and functions as a conductor with respect electric charges of the other polarity. The charge transport layer 4 is formed by a material that exhibits a great difference ($10^2$ or greater, preferably $10^3$ or greater) in the mobility of electric charges which are charged in the upper planar electrode 2 and the mobility of electric charges having the opposite polarity. Examples of such a material include: organic compounds, such as poly N vinyl carbazole (PVK), N,N'-diphenyl-N,N'-bis(3-methylphenyl)-[1,1'-biphenyl]-4, 4'-diamine (TPD), and discotic liquid crystals; TPD polymer (polycarbonate, polystyrene, PVK) dispersoids; and semiconductor materials, such as a-Se doped with 10 to 200 ppm of Cl.

The readout photoconductive layer 5 generates charge pairs when irradiated by readout light L1 or erasing light L2. The readout photoconductive layer 5 is formed by a film of photoconductive material having a thickness of 0.1 μm to 1 μm, with at least one of: a-Se; Se—Te; Se—As—Te; non metallic phthalocyanine; metallic phthalocyanine; MgPc (magnesium phthalocyanine); VoPc (phase II of vanadyl phthalocyanine); and CuPc (copper phthalocyanine) as its main component.

The divided electrodes 106 include a plurality of first linear electrodes 6 and a plurality of second linear electrodes 7. The first linear electrodes 6 are arranged as stripes, and read out image data recorded in the radiation image detector 100 as signal charges when the readout light L1 is irradiated onto the radiation image detector 100. The first linear electrodes 6 are formed by a material that transmits the readout light L1 and the erasing light L2. The first linear electrodes 6 may be formed by NESA ($SnO_2$), ITO (Indium Tin Oxide), IDIXO (Idemitsu Indium X-metal Oxide by Idemitsu), which is an amorphous light transmissive oxide film, or the like, formed to a thickness of 50 nm to 200 nm. Alternatively, the first linear electrodes 6 may be formed by Al or Au films or the like having a thickness of 100 nm.

The second linear electrodes 7 are arranged between adjacent first linear electrodes 6 as stripes, and are formed by materials that block the readout light L1 and transmit the erasing light L2. The second linear electrodes 7 are configured to be grounded when the erasing light L2 is irradiated, such that residual charges remaining in a charge accumulating section 10 or in the reading photoconductive layer 5 are discharged. Note that the second linear electrodes 7 are charged with positive electric charges during recording of radiation image data into the radiation image detector 100, and grounded when the readout light L1 is irradiated onto the radiation image detector 100.

The second linear electrodes 7 are equipped with inclined electrode surfaces 7b, which are inclined with respect to the charge accumulating section 11. Specifically, each of the second linear electrodes 7 is equipped with a flat electrode surface 7a, which is substantially parallel to the charge accumulating section 10, and inclined electrode surfaces 7b, which are formed on each of the sides of the flat electrode surface 7a. The flat electrode surface 7a is formed to extend along the longitudinal direction of the second linear electrode 7, and the inclined electrode surfaces 7b are formed on the side surfaces of the second electrode 7 (the surfaces perpendicular to the longitudinal direction thereof). Each second electrode 7 is formed between adjacent first electrodes 6 to have a substantially trapezoidal cross section, stacked on the backing layer 9. Note that the backing layer 9 is formed by a photosensitive or a non photosensitive material that transmits the readout light L1 and the erasing light. Examples of such a material include: epoxy resins; acrylic resins; urethane resins; polyester resins; polyimide resins; polyolefin resins; gelatin; and mixtures of novolac resins with naphthoquinone diazisulfonate. A conductive film is formed on the surface of the backing layer 9 such that each of the second linear electrodes 7 is formed to have the flat electrode surface 7a and the inclined electrode surfaces 7b.

Each second electrode 7 is formed such that the width W10 thereof is 30 μm, the width W1 of the flat electrode surface 7a is 10 μm, and the height h from the substrate is 10 μm. The width W of each inclined electrode surface 7b is 10 μm, and the inclined electrode surfaces 7b are formed such that angles of inclination a thereof with respect to the upper planar electrode 2 are 45°. At this time, the width W of each inclined electrode surface 7b is $\frac{1}{10}$ the space D between the second linear electrode 7 and the first linear electrode 6 adjacent thereto or greater. For example, in the case that the space D is 10 μm, the width W needs to be 1 μm or greater. Further, although a case in which the angle of inclination α=45' has been described, any angle within the range of 30° to 60° may be adopted.

The readout light shielding films 8 that transmit the erasing light L2 and block the readout light L1 are formed on the region of each second linear electrode 7. The readout light shielding films 8 are formed by a red resist that transmits red light and blocks blue light, in the case that the readout light L1 is blue light having a wavelength within the range of 400 nm to 480 nm, and the erasing light L2 is red light having a wavelength within the range of 580 nm to 700 nm. Accordingly, only the erasing light L2 is irradiated onto the regions of the readout photoconductive layer 5 above the readout light shielding films 8.

Figure 5A:
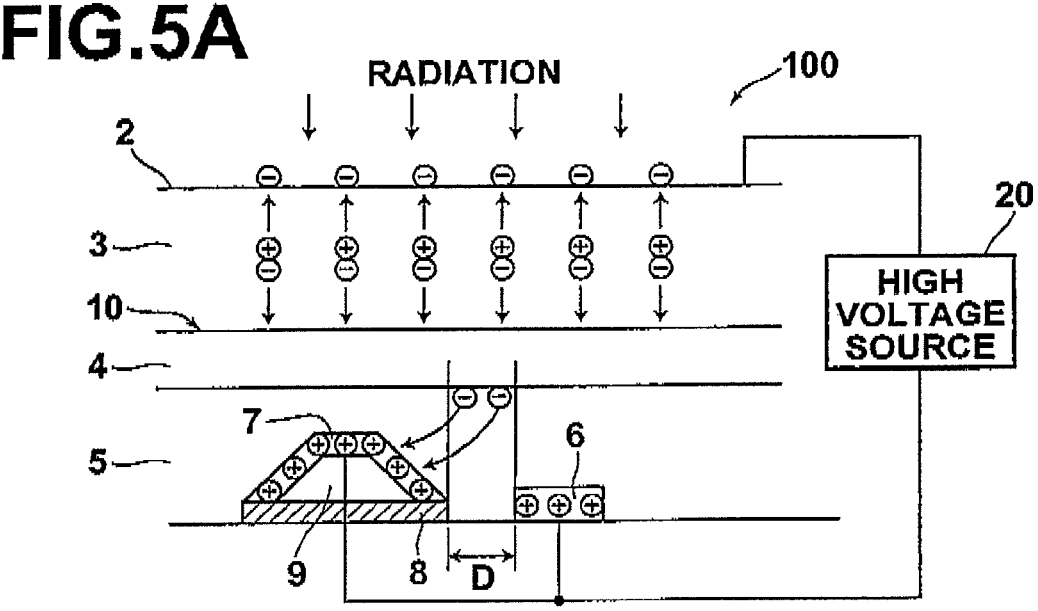
FIG. 5A and FIG. 5B are diagrams that illustrate how a radiation image is recorded by the radiation image detector of FIG. 3.

FIG. 5 through FIG. 7 are diagrams that schematically illustrate the manner in which a radiation image is recorded and reproduced onto and from the radiation image detector 100. An example of the operation of the radiation image detector 100 will be described with reference to FIG. 3 through FIG. 7. First, as illustrated in FIG. 5A, the high voltage source HV applies high voltage between the upper planar electrode 2 and each of the first linear electrodes 6 and the second linear electrodes 7. Radiation is irradiated onto a subject from a radiation source in this state.

Figure 5B:
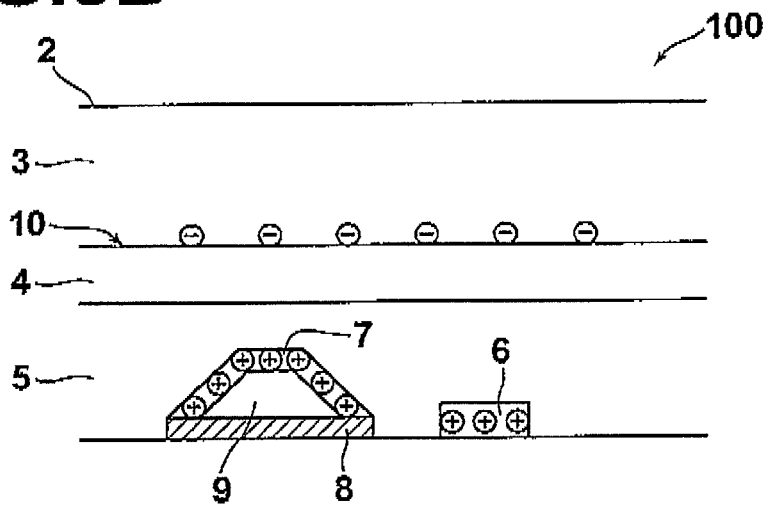

The radiation, which has passed through the subject, is irradiated onto the radiation image detector 100 from the side of the upper planar electrode 2. The radiation passes through the upper planar electrode 2 and is irradiated onto the recording photoconductive layer 3. The irradiation of radiation causes charge pairs to be generated within the recording photoconductive layer 3. Positive electric charges form among the charge pairs combine with the negative charges charged on the upper planar electrode 2 and disappear, while negative electric charges are accumulated at the charge accumulating section 10 formed at the interface between the recording photoconductive layer 3 and the charge transport layer to be recorded as a latent image, as illustrated in FIG. 5B.

The inclined electrode surfaces 7b are formed at the edges of the second linear electrodes 7. Therefore, charging of leaked charges in the spaces between the first linear electrodes 6 and the second linear electrodes 7 of the readout photoconductive layer 5 is reduced, and the occurrence of residual images due to residual electric charges can be prevented. That is, there are cases in which a portion of signal charges generated by X ray irradiation is not accumulated in the charge accumulating section 10, that is, charge leakage occurs through the charge accumulating section 10. Charge leakage is likely to occur particularly in the case that high dosage X ray irradiation is performed. In these cases, leaked charges, which leak though the charge accumulating section 10 at regions above the first linear electrodes 6 and the second linear electrodes 7, are discharged by the first linear electrodes 6 and the second linear electrodes 7. On the other hand, leaked charges, which pass through the regions above the spaces between the first linear electrodes 6 and the second linear electrodes 7, are not discharged by the first linear electrodes 6 or the second linear electrodes 7, and charge the spaces between the first linear electrodes 6 and the second linear electrodes 7.

However, the inclined electrode surfaces 7b are formed as illustrated in FIG. 4 and FIG. 5. The inclined electrode surfaces 7b form electrical fields in directions different from the electrical fields of the first linear electrodes 6 and the flat electrode surfaces 7a. Accordingly, leaked electric charges that pass through the regions above the spaces between the first linear electrodes 6 and the second linear electrodes 7 can be drawn toward the inclined electrode surfaces 7b and discharged. Thereby, the amount of leaked electric charges which are read out from the spaces among the first linear electrodes 6 and the second linear electrodes 7 during readout of signal charges can be reduced, and the occurrence of residual images due to leaked electric charges can be suppressed. Because the inclined electrode surface 7b are provided on the second linear electrodes 7, the percentage of signal charges inducted into the second linear electrodes 7 increases. Thereby, readout efficiency is improved.

In other words, electric fields are formed in the directions normal to the inclined electrode surfaces 7b, when the inclined electrode surfaces 7b are charged. These electric fields act on the regions between the second linear electrodes 7 and the first linear electrodes 6 toward the directions normal to the inclined electrode surfaces 7b. Accordingly, electric charges which remain in the charge accumulating section 10 are positively removed, and the occurrence of residual images due to residual electric charges can be prevented.

It was found that electric fields sufficiently large to draw the leaked charges into the inclined electrode surfaces 7b are capable of being formed, in the case that the widths W of the inclined electrode surfaces 7b are formed to be 1/10 the length of the space D between the first linear electrodes 6 and the second linear electrodes 7 or greater. Accordingly, the residual electric charges could be positively removed.

Next, the readout operation of the recorded radiation image will be described with reference to FIG. 6. First, the upper planar electrode 2 and the second linear electrodes 7 are grounded, and the first linear electrodes 6 are electrically connected to charge amplifiers 30. The readout light L1 is emitted onto the readout photoconductive layer 5 in this state, from the side of the radiation image detector 100 at which the first linear electrodes 6 and the second linear electrodes 7 are provided. Charge pairs are generated within the readout photoconductive layer 5 due to irradiation of the readout light L1. Positive electric charges from among the charge pairs combine with the latent image charges, which are accumulated at the charge accumulating section 10. At the same time, negative electric charges from among the charge pairs combine with the positive charges of the charged first linear electrodes 6. The combinations of charges cause current to flow through the charge amplifiers 30. The current is integrated and detected as image signals. By providing the readout light shielding films 8 in this manner, charge pairs are not generated in the regions above the second linear electrodes 7. Thereby, signal charges accumulated at the charge accumulating section 10 are prevented from being discharged by the second linear electrodes 7, and deterioration in image quality can be prevented.

After readout of the radiation image is complete, the erasing light L2 is irradiated onto the readout photoconductive layer 5 from the side of the radiation image detector 100 at which the first linear electrodes 6 and the second linear electrodes 7 are provided. The erasing light L2 is irradiated to erase residual electric charges from the charge accumulating section 11 and the interfaces between the readout photoconductive layer 5 and the second linear electrodes 7. At this time, the second linear electrodes 7 are in a grounded state. The irradiation of the erasing light L2 causes charge pairs to be generated within the readout photoconductive layer 5. Positive electric charges from among the charge pairs combine with the residual electric charges and disappear, while negative electric charges from among the charge pairs combine with the positive electric charges which are charged in the second linear electrodes 7, thereby erasing the residual electric charges.

FIG. 8 illustrates the steps involved in a preferred embodiment of a method for manufacturing the radiation image detector of the present invention. The method for manufacturing the radiation image detector will be described with reference to FIG. 3 through FIG. 8. First, a red resist, which will become the readout light shielding film 8, is coated on a substrate 10A, which is made of glass or the like, as illustrated in FIG. 8A. Then, patterning is performed by exposure such that the red resist becomes a striped pattern corresponding to the regions at which the second linear electrodes 7 are to be formed, to form the readout light shielding films 8.

Figure 8A:
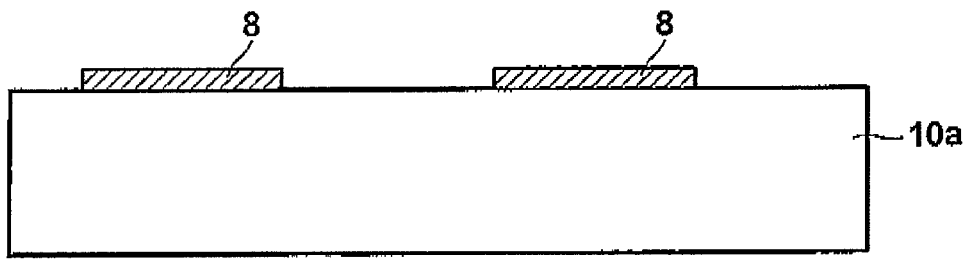
FIGS. 8A, 8B, 8C, and 8D illustrate the steps involved in a preferred embodiment of a method for manufacturing the radiation image detector of FIG. 3.
Figure 8B:
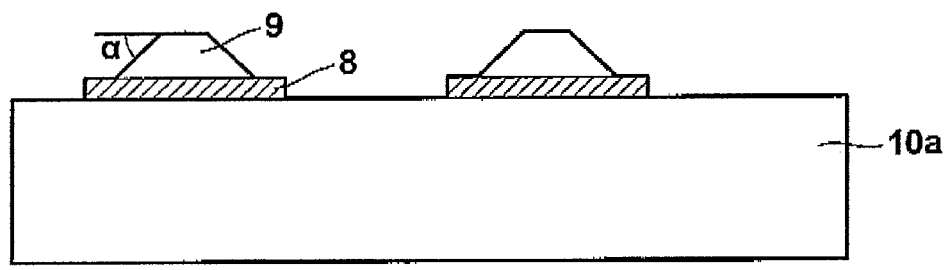
Figure 8C:
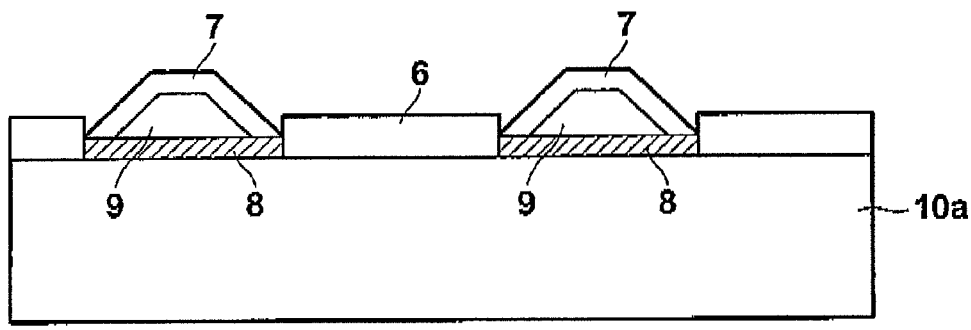
Figure 8D:
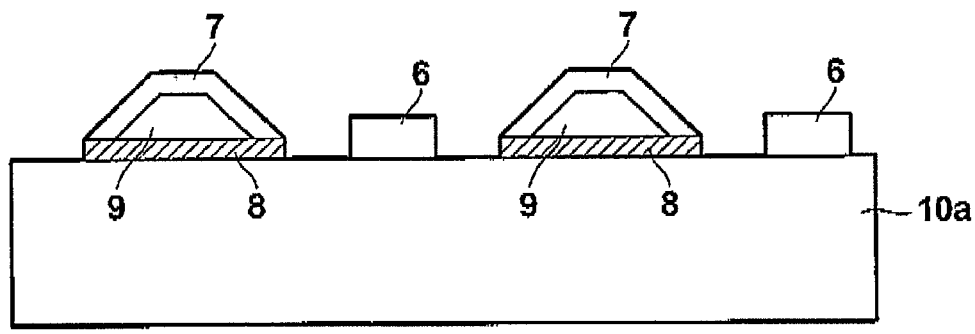

Next, the backing layers 9 are formed on the readout light shielding films 8 by a photolithography technique, as illustrated in FIG. 8B. Here, the backing layers 9 are formed such that they are trapezoidal in cross section by anisotropic etching or the like. The dimensions of the backing layers 9 are: 10 μm thick; 30 μm wide lower edges; and 10 μm wide upper edges. The backing layers 9 are formed such that the angle of inclination α with respect to the surface of the substrate 10a, that is, the angle of inclination α with respect to the charge accumulating section 10, is 45°. Thereafter, a 0.2 μm thick conductive film, for example, is formed on the surface of the substrate 10a. Thereby, a plurality of first linear electrodes 6 arranged as stripes are formed on the substrate 10a, and a plurality of second linear electrodes 7 arranged as stripes are formed on the backing layers 9, as illustrated in FIG. 8C. Then, gaps of 10 μm, for example, are formed between the first linear electrodes 6 and the second linear electrodes 7 by photolithography, in order to electrically isolate the first and second linear electrodes from each other.

The radiation image detector is produced by stacking the readout photoconductive layer 5, the charge transport layer 4, the recording photoconductive layer 3, and the upper planar electrode 2 on the first linear electrodes 6 and the second linear electrodes 7, in this order (refer to FIG. 3 and FIG. 4).

According to the embodiment described above, even in cases that a portion of the signal charges generated by X ray irradiation passes through the charge accumulating section 10 between the first linear electrodes 6 and the second linear electrodes 7, the leaked charges can be discharged by the electrical fields formed by the inclined electrode surfaces 7b. Therefore, the amount of leaked electric charges which are charged in the spaces among the first linear electrodes 6 and the second linear electrodes 7 during readout of signal charges can be reduced, and the occurrence of residual images due to leaked electric charges can be suppressed.

Note that the widths W of the inclined electrode surfaces 23b and 7b are 1/10 the intervals between the divided electrodes or greater, as illustrated in FIG. 1 and FIG. 4. Therefore, drawing of the leaked charges into the inclined electrode surfaces 23b and 7b is facilitated further. Accordingly, the occurrence of residual images caused by residual electric charges can be more effectively reduced.

Further, the divided electrodes 23 of FIG. 1 and the divided electrodes 7 (the second linear electrodes 7) of FIG. 4 have the flat electrode surfaces 23a and 7a. The inclined electrode surfaces 23b and 7b are provided at the outer peripheral portions of the flat electrode surfaces 23a and 7b. Therefore, the flat electrode surfaces 23a and 7a can positively read out signal charges and discharge residual charges, while the inclined electrode surfaces can remove leaked charges.

By providing the readout light shielding films 8 that transmit the erasing light L2 and block the readout light L1 as illustrated in FIG. 3 and FIG. 4, charge pairs are not generated in the regions above the second linear electrodes 7. Thereby, signal charges accumulated at the charge accumulating section 10 are prevented from being discharged by the second linear electrodes 7, and deterioration in image quality can be prevented.

Figure 9A:
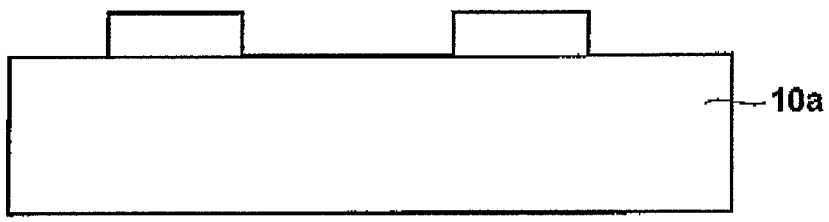
FIGS. 9A, 9B, and 9C illustrate the steps involved in an alternate embodiment of a method for manufacturing the radiation image detector of FIG. 3.
Figure 9B:
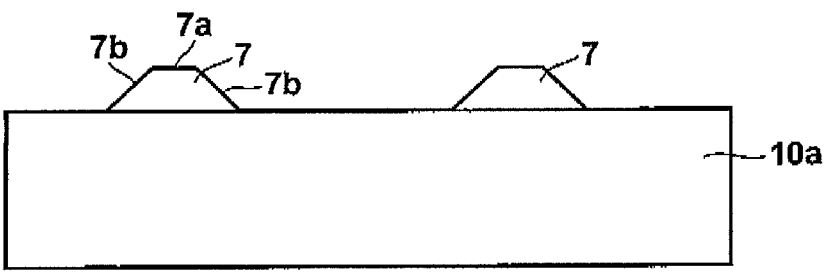
Figure 9C:
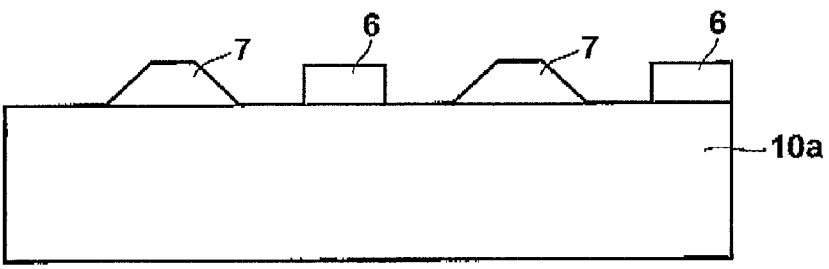

Note that the present invention is not limited to the embodiments described above. For example, the backing layers 9 are employed to form the inclined electrode surfaces 7b in FIG. 8. Alternatively, conductive films may be employed instead of the backing layers 9. Specifically, 5 μm thick conductive films may be formed on the substrate 10a, and patterning may be performed by photolithography, to form the second linear electrodes 7 as stripes, as illustrated in FIG. 9A. Then, etching is performed such that the striped conductive films has tapers, as illustrated in FIG. 9B. Thereby, the flat electrode surfaces 7a and the inclined electrode surfaces 7b are formed on the second linear electrodes 7. Thereafter, the first linear electrodes 6 may be formed in the spaces among the second linear electrodes 7 by photolithography, as illustrated in FIG. 9C. In this case, the number of photolithography steps is reduced, and manufacturing costs can be decreased. Al, which has a low resistance value, may be used as the material of the first linear electrodes 6 and the second linear electrodes 7, when the first linear electrodes 6 and the second linear electrodes 7 are formed directly on the substrate 10a, without providing the readout light shielding films 8.

Figure 10:
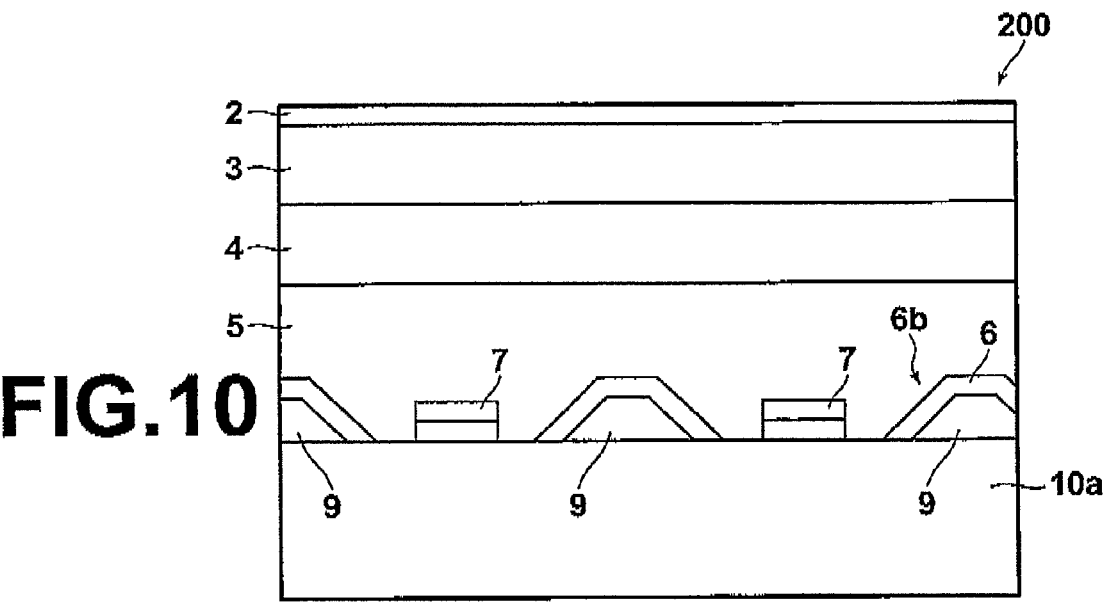
FIG. 10 is a diagram that illustrates the schematic construction of a radiation image detector according to a third embodiment of the present invention.
Figure 11:
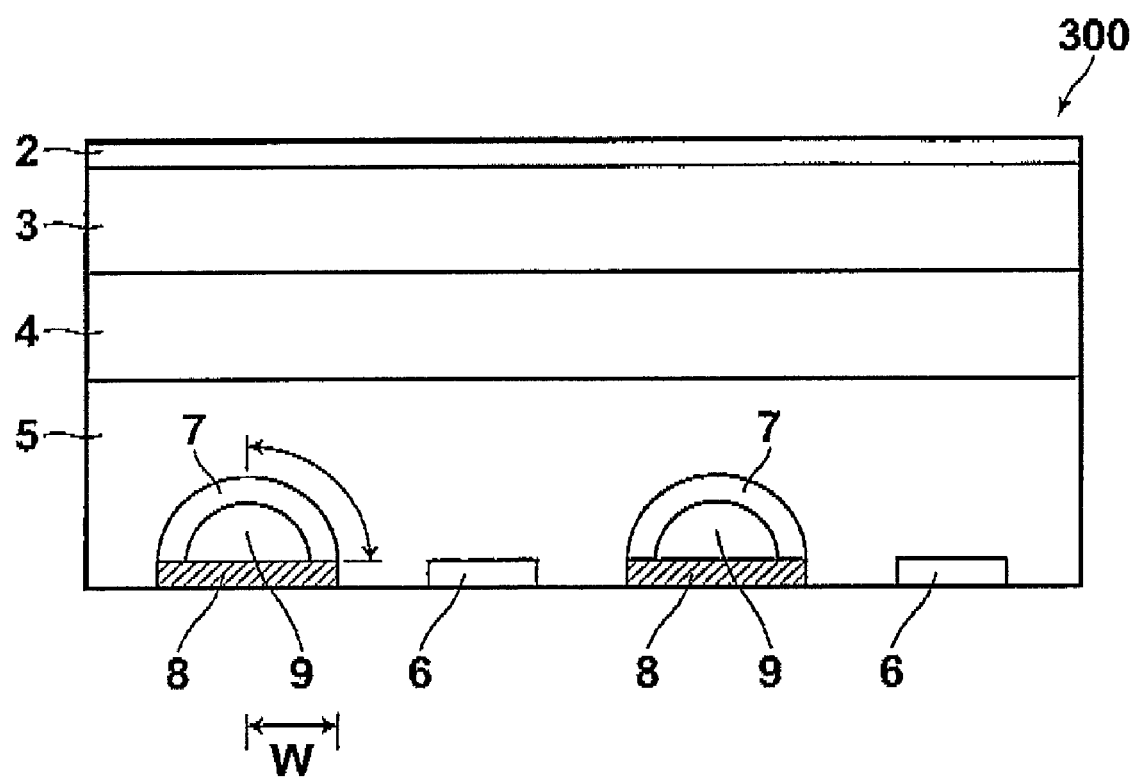
FIG. 11 is a diagram that illustrates the schematic construction of a radiation image detector according to a fourth embodiment of the present invention.

Further, in the second embodiment described above, the inclined electrode surfaces 7b were provided on the second linear electrodes 7. Alternatively, inclined electrode surfaces 6b may be formed on the first linear electrodes 6, as illustrated in FIG. 10. The inclined electrode surfaces 6b and 7b may also be provided on both the first linear electrodes 6 and the second linear electrodes 7. In addition, an example in which the inclined electrode surfaces 7b were formed as planar surfaces was described. Alternatively, the inclined electrode surfaces may be formed as curved surfaces, as illustrated in FIG. 11. In this case as well, the width W of the inclined electrode surfaces are formed to be 1/10 the length of the space D between the first linear electrodes 6 and the second linear electrodes 7 or greater.

An example in which the inclined electrode surfaces 7b are formed uniformly along the longitudinal direction of the second linear electrodes 7 was described as the second embodiment. However, it is only necessary for the inclined electrode surfaces to be formed in effective image obtaining regions of the radiation image detector 100, at which image data is to be obtained. That is, the side surfaces of the second linear electrodes 7 may be substantially perpendicular to the charge accumulating section 10 at regions other than the effective image obtaining regions.

Finally, radiation image detectors that record radiation images by directly converting radiation into electric charges, that is, so called "direct conversion type" radiation image detectors, were described as the first and second embodiments. However, the present invention is not limited to this type of radiation image detector, and may be applied to radiation image detectors of the so called "indirect conversion type", in which radiation images are recorded by converting radiation to visible light, then converting the visible light to electric charges.

What is claimed is:

1. A radiation image detector, comprising:
    an upper planar electrode that transmits electromagnetic waves bearing radiation image information;
    a charge generating layer that generates electric charges when irradiated by the electromagnetic waves which are transmitted through the upper planar electrode; and
    a plurality of divided electrodes for collecting the electric charges generated by the charge generating layer; wherein:
    the divided electrodes have inclined electrode surfaces, which are inclined with respect to the upper planar electrode.

2. A radiation image detector as defined in claim 1, wherein: the widths of the inclined electrode surfaces are 1/10 the intervals between the divided electrodes or greater.

3. A radiation image detector as defined in claim 1, wherein:
    the inclined electrode surfaces are provided at the outer peripheral portions of the divided electrodes; and
    flat electrode surfaces, which are substantially parallel to the upper planar electrodes, are provided on the divided electrodes between the inclined electrode surfaces.

4. A radiation image detector as defined in claim 1, wherein the inclined electrode surfaces are configured to generate an electric field and draw in leaked charges into the inclined electrode surfaces from the charge generating layer which have leaked through regions in the charge generating layer above spaces between the divided electrodes.

5. A radiation image detector as defined in claim 1, wherein the charge generating layer is stacked on the divided electrodes such that a surface of the charge generating layer abuts an entire surface of each of the inclined electrode surfaces.

6. A radiation image detector as defined in claim 1, wherein the divided electrodes extend within a portion of the charge generating layer such that a surface of the charge generating layer abuts an entire surface of each of the inclined electrode surfaces.

7. A radiation image detector as defined in claim 1, further comprising a plurality of second divided electrodes, each disposed between an adjacent divided electrode having inclined electrode surfaces, and the second divided electrodes having a flat electrode surface and no inclined electrode surface.

8. A radiation image detector as defined in claim 2, wherein the inclined electrode surfaces have an angle of inclination of 30 to 60 degrees.

9. A radiation image detector as defined in claim 3, wherein the inclined electrode surfaces are configured to generate an electric field in directions different from electric fields generated from the flat electrode surfaces, and the inclined electrode fields draw in leaked charges into the inclined electrode surfaces from the charge generating layer which have leaked through regions in the charge generating layer above spaces between the divided electrodes.

* * * * *